United States Patent
Day

(10) Patent No.: US 10,474,996 B2
(45) Date of Patent: Nov. 12, 2019

(54) WORKFLOW MANAGEMENT SYSTEM PLATFORM

(71) Applicant: SAP SE, Walldorf (DE)

(72) Inventor: Rouven Day, Waghäusel (DE)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 15/370,773

(22) Filed: Dec. 6, 2016

(65) Prior Publication Data

US 2018/0158024 A1   Jun. 7, 2018

(51) Int. Cl.
*G06Q 10/00* (2012.01)
*G06Q 10/10* (2012.01)

(52) U.S. Cl.
CPC ........ *G06Q 10/103* (2013.01); *G06T 2200/24* (2013.01)

(58) Field of Classification Search
CPC .......................... G06Q 10/103; G06T 2200/24
See application file for complete search history.

(56) References Cited

U.S. PATENT DOCUMENTS

| | | | | |
|---|---|---|---|---|
| 4,813,013 A * | 3/1989 | Dunn | ........................ | G06F 8/34 715/763 |
| 5,621,871 A * | 4/1997 | Jaremko | ............... | G06F 3/0481 345/441 |
| 5,923,552 A * | 7/1999 | Brown | .................. | G06Q 10/06 700/100 |
| 6,115,646 A * | 9/2000 | Fiszman | ................ | G06Q 10/10 700/104 |
| 6,243,101 B1 * | 6/2001 | Erskine | .................... | G06T 11/00 345/619 |
| 6,393,425 B1 * | 5/2002 | Kelly | ..................... | G06T 11/206 |
| 6,460,058 B2 * | 10/2002 | Koppolu | ............... | G06F 16/748 715/738 |
| 6,604,114 B1 * | 8/2003 | Toong | ................... | G06F 16/338 |
| 6,609,100 B2 * | 8/2003 | Smith | .................... | G06Q 10/06 705/7.26 |

(Continued)

OTHER PUBLICATIONS

Step by Step, Microsoft Project 2010, Copyright © 2010 by Carl Chatfield and Timothy Johnson (Year: 2010).*

(Continued)

*Primary Examiner* — Jonathan G Sterrett
(74) *Attorney, Agent, or Firm* — Buckley, Maschoff & Talwalkar LLC

(57) ABSTRACT

A workflow management system platform may access electronic data records in a scenario database, including, for each of a plurality of scenarios, a scenario identifier and a set of associated workflow identifiers. Electronic data records in a workflow database may also be accessed, including, for each of a plurality of workflows, a workflow identifier, a valid from date, a valid to date, and an order value. Some embodiments may then automatically display information about the plurality of scenarios. For example, for each workflow associated with a scenario, a workflow area may be displayed extending from a start location associated with the workflow's valid from date on the graphical timeline to an end location associated with the workflow's valid to date on the graphical timeline. According to some embodiments, workflow areas within a scenario may be presented in a sequence in accordance with order values.

16 Claims, 15 Drawing Sheets

(56) References Cited

U.S. PATENT DOCUMENTS

| | | | | |
|---|---|---|---|---|
| 7,275,039 | B2* | 9/2007 | Setteducati | G06Q 10/06314 705/7.24 |
| 7,546,346 | B2* | 6/2009 | Ouchi | G06Q 10/10 709/206 |
| 7,685,013 | B2* | 3/2010 | Gendler | G06Q 10/06313 705/7.23 |
| 7,844,480 | B2* | 11/2010 | Ricketts | G06Q 10/06 705/7.23 |
| 7,904,324 | B2* | 3/2011 | Gura | G06Q 10/06311 705/7.23 |
| 2007/0240046 | A1* | 10/2007 | Yan | G06Q 10/06 715/700 |
| 2008/0077612 | A1* | 3/2008 | Zobin | G06F 16/2477 |
| 2008/0313596 | A1* | 12/2008 | Kreamer | G06Q 10/06 717/101 |
| 2012/0246170 | A1* | 9/2012 | Iantorno | G06F 11/3672 707/748 |
| 2013/0085798 | A1* | 4/2013 | Spatola | G06Q 10/06 705/7.24 |
| 2013/0212200 | A1* | 8/2013 | Dennis | H04L 51/22 709/206 |
| 2013/0339922 | A1* | 12/2013 | Sproule | G06Q 10/063 717/103 |
| 2016/0055079 | A1* | 2/2016 | Hanna | G06F 11/3692 717/135 |
| 2016/0098470 | A1* | 4/2016 | Richman | G06F 16/27 709/203 |

OTHER PUBLICATIONS

"Open Data Protocol", wikipedia's entry of Feb. 2015, retrieved at: http://web.archive.org/web/20150222223434/https://en.wikipedia.org/wiki/Open_Data_Protocol (Year: 2015).* https://en.wikipedia.org/wiki/Workflow_Management_Coalition, downloaded from the web on May 15, 2019 (Year: 2019).*

* cited by examiner

WORKFLOW MANAGEMENT SYSTEM PLATFORM

FIELD

Some embodiments are associated with workflow management for an enterprise. In particular, some embodiments describe an interactive graphical user interface for a workflow management system platform.

BACKGROUND

An enterprise may need to perform a number of different tasks. Moreover, the tasks may need to be performed in a particular order and/or may need to be scheduled during particular periods of time. In addition, the enterprise may need to perform different sets of tasks in different situations or "scenarios." For example, a marketing department of an enterprise might need to perform one set of tasks to receive approvals for a marketing campaign and another set of tasks associated with target audiences or groups. It can be difficult, however, for a manager (or other user) to understand which tasks have already been performed, which tasks still need to be performed, which tasks must be completed before other tasks can be started, etc. This can be especially true when an enterprise or user is responsible for a relatively large number of tasks and/or scenarios. For example, making scheduling decisions when reviewing a list of task names and associated dates can be a time consuming and error prone process (e.g., a user might not realize that a particular task should not be started because another task is still being performed).

It may therefore be desirable to provide systems and methods to facilitate presentation of and interaction with workflow schedules in an intuitive and flexible manner.

SUMMARY OF THE INVENTION

According to some embodiments, systems, methods, apparatus, computer program code and means are provided to facilitate presentation of and interaction with workflow schedules in an intuitive and flexible manner. In some embodiments, a workflow management system platform may automatically and graphically display results of a gap analysis and/or allow for schedule adjustments by a user.

According to some embodiments, a workflow management system platform may access electronic data records in a scenario database, including, for each of a plurality of scenarios, a scenario identifier and a set of associated workflow identifiers. Electronic data records in a workflow database may also be accessed, including, for each of a plurality of workflows, a workflow identifier, a valid from date, a valid to date, and an order value. Some embodiments may then automatically display information about the plurality of scenarios. For example, for each workflow associated with a scenario, a workflow area may be displayed extending from a start location associated with the workflow's valid from date on the graphical timeline to an end location associated with the workflow's valid to date on the graphical timeline. According to some embodiments, workflow areas within a scenario may be presented in a sequence in accordance with order values.

Some embodiments comprise: means for accessing, by a workflow management system platform, electronic data records in a scenario database, including, for each of a plurality of scenarios, a scenario identifier and a set of associated workflow identifiers; means for accessing electronic data records in a workflow database, including, for each of a plurality of workflows, a workflow identifier, a valid from date, a valid to date, and an order value; means for displaying a substantially linear graphical timeline representing a series of dates; and means for automatically displaying information about the plurality of scenarios, including, for each workflow associated with a scenario: a workflow area extending from a start location associated with the workflow's valid from date on the graphical timeline to an end location associated with the workflow's valid to date on the graphical timeline, wherein workflow areas within a scenario are presented in a sequence in accordance with the order values.

In some embodiments, a communication device associated with a back-end application computer server exchanges information with remote devices. The information may be exchanged, for example, via public and/or proprietary communication networks.

Technical effects of some embodiments of the invention are improved and computerized ways to facilitate presentation of and interaction with workflow schedules in an intuitive and flexible manner. With these and other advantages and features that will become hereinafter apparent, a more complete understanding of the nature of the invention can be obtained by referring to the following detailed description and to the drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

An enterprise such as a business may need to perform a number of different tasks that need to be performed in a particular order and/or that need to be scheduled during particular periods of time. In addition, the enterprise may need to perform different sets of tasks in different situations or "scenarios." For example, a production department may need to complete a series of product tests before a marketing department can begin to sell that product to customers. It can be difficult, however, for a manager (or other user) to understand which tasks have already been performed, which tasks still need to be performed, which tasks must be completed before other tasks can be started, etc. This can be especially true when an enterprise or user is responsible for a relatively large number of tasks and/or scenarios. For example, making scheduling decisions when reviewing a list of task names and associated dates can be a time consuming and error prone process (e.g., a user might not realize that a particular task should not be started because another task is still being performed).

Figure 1:
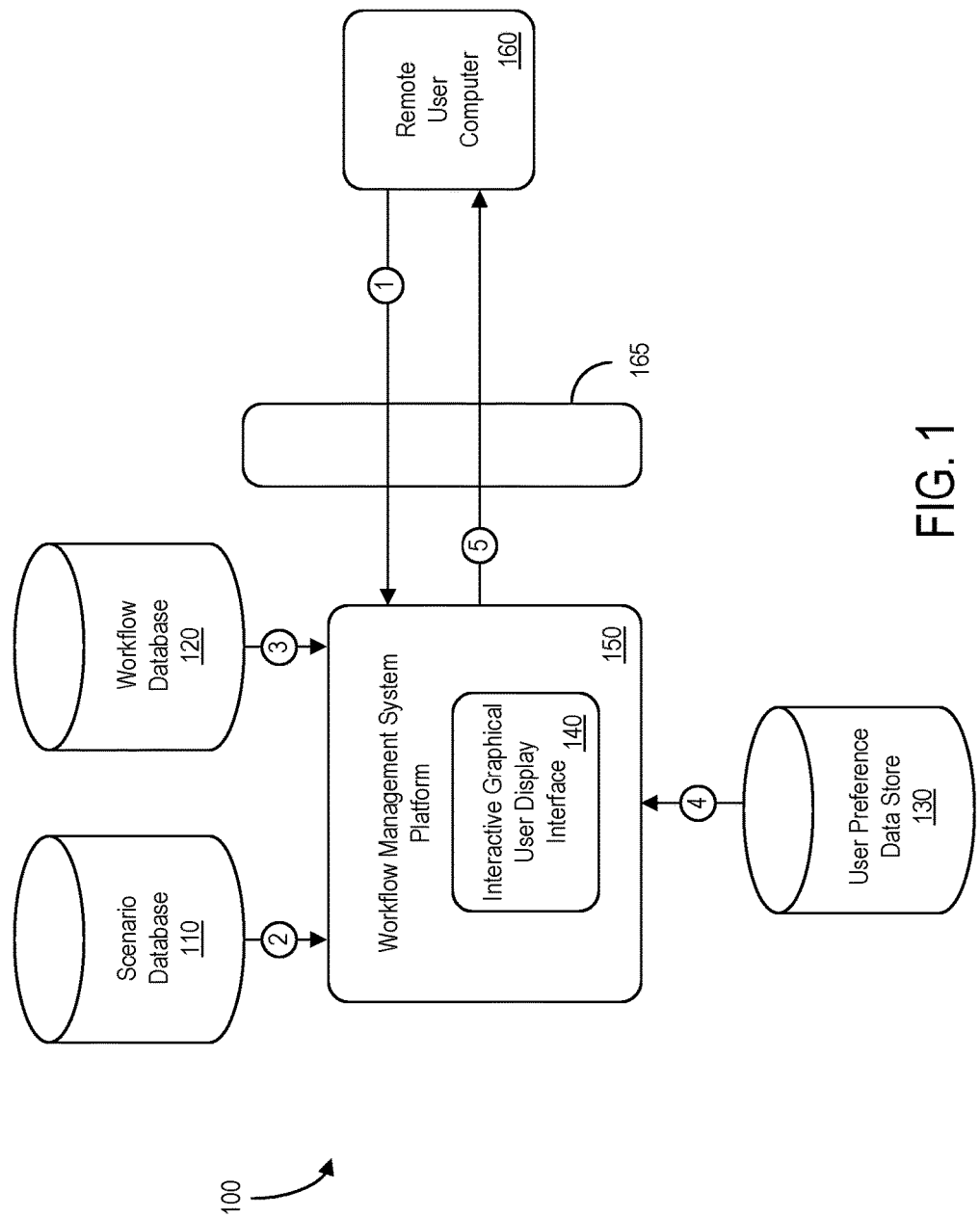
FIG. 1 is a high level block diagram of a computer system in accordance with some embodiments.

It may therefore be desirable to provide systems and methods to facilitate presentation of and interaction with workflow schedules in an intuitive and flexible manner. A used herein, the phrase "workflow" may refer to, for example, any task or series of tasks that may need to performed for an enterprise (e.g., creating documents, obtaining approvals, conducting meetings or focus groups, etc.). FIG. 1 is a high-level block diagram of a system 100 according to some embodiments of the present invention. In particular, the system includes a scenario database 110 and a workflow database 120 that provide information to a workflow management system platform 150. The workflow management system platform 150 may also exchange information with one or more remote user computers 160 (e.g., via a firewall 165) and/or execute an interactive graphical user display interface 140. According to some embodiments, interactive graphical user display interface 140 executes at the workflow management system platform 150 to facilitate an intuitive and flexible ability to view workflows and/or to help a user make schedule adjustments. According to some embodiments, the workflow management system platform 150 and/or interactive graphical user display interface 140 might be associated with a third-party, such as a vendor that performs a service for an enterprise.

The workflow management system platform 150 might be, for example, associated with a Personal Computer ("PC"), laptop computer, smartphone, an enterprise server, a server farm, and/or a database or similar storage devices. According to some embodiments, an "automated" or "semi-automated" workflow management system platform 150 and/or interactive graphical user display interface 140 may process information that is provided to the remote user computer 160. As used herein, the term "automated" may refer to, for example, actions that can be performed with little (or no) intervention by a human.

As used herein, devices, including those associated with the workflow management system platform 150, and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The workflow management system platform 150 may store information into and/or retrieve information from a user preference data store 110. The user preference data store 110 might, for example, store a set of electronic records representing how individual users (or types of users) would like to utilize workflow and scheduling options for an enterprise. The user preference data store 110 may also contain information about past and current interactions with parties, including those associated with remote user computers 160 (e.g., to let the system 100 learn over time how users or types of users like to utilize workflow and scheduling options). The user preference data store 110 may be locally stored or reside remote from the workflow management system platform 150. As will be described further below, the user preference data store 110 may be used by the workflow management system platform 150 to automatically present scenario and workflow information to a user (and to let the user make adjustments as appropriate). Although a single workflow management system platform 150 is shown in FIG. 1, any number of such devices may be included. Moreover, various devices described herein might be combined according to embodiments of the present invention. For example, in some embodiments, the workflow management system platform 150 and user preference data store 110 might be co-located and/or may comprise a single apparatus.

According to some embodiments, the system 100 may facilitate a user's viewing of and/or adjustments to workflow data via the workflow management system platform 150. For example, at (1) a user at a remote user computer 160 might request to view an interactive display. In response to this request, the workflow management system platform 150 may retrieve information from the scenario database 110 at (2) and the workflow database 120 at (3). According to some embodiments, the workflow management system platform may also retrieve information from the user preference data store 130 at (4). This information may then be used to process and transmit data from the interactive graphical user display interface 140 to the remote user computer 160 at (5) for display to and/or to adjustment by the user. Note that the workflow management system platform 150 may, in some embodiments, tightly and seamlessly interact with existing applications such that minimal setup requirements are necessary. Instead, the workflow management system platform 150 may work with applications, plugins, and/or other functional elements so as to be available to users with minimal effort.

In some embodiments described herein, the system 100 may include applications that are released and able to run on various combinations of database systems, Operating Systems ("OSs"), virtualization layers and cloud services, such as Infra-Structure as a Service ("IaaS") implementations. Moreover, embodiments might include real time analytics, interactive data exploration, and/or an application platform associated with, for example, the High-performance ANalytic Appliance ("HANA") in-memory, column-oriented, relational database management system developed and marketed by SAP SE®. Such an application platform might include, for example, an OnLine Analytical Processing ("OLAP") engine, a predictive engine, a spatial engine, application logic, a rendering platform, etc. A real-time data acquisition device may include landscape transformation, a replication server, and/or an event stream processor. According to some embodiments, an application platform and/or real-time data acquisition device may exchange information with transactional, analytical, online applications. An application platform may also exchange information with customer mobile applications (e.g., associated with mobile platforms), a business object suite (e.g., associated with exploration, reporting, dashboarding, predictive functions, and/or mobile versions), business objects data services, etc.

Figure 2:
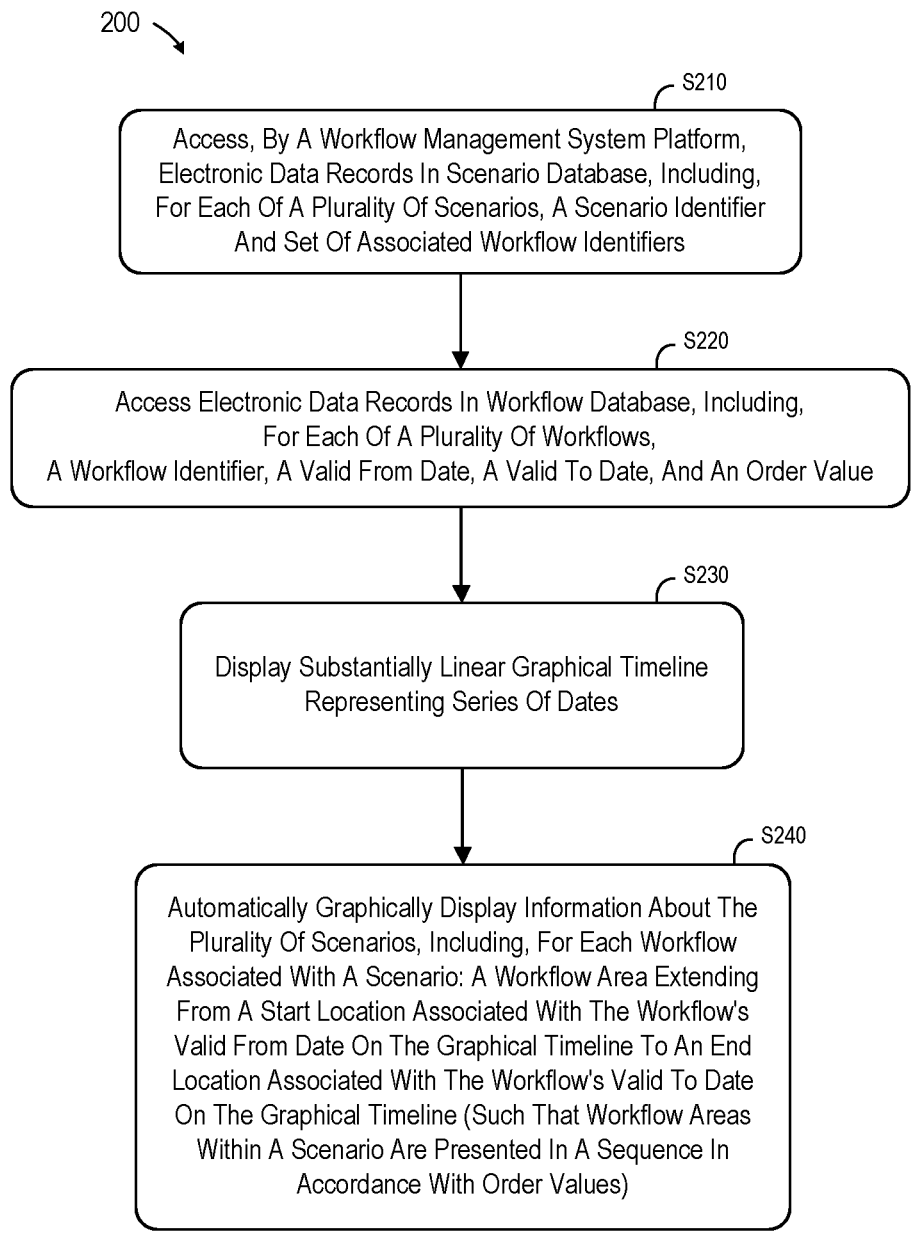
FIG. 2 is a flow diagram of a method according to some embodiments.

Note that the system 100 of FIG. 1 is provided only as an example, and embodiments may be associated with additional elements or components. According to some embodiments, the elements of the system 100 automatically facilitate the viewing and/or adjustment of workflow information by a user. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a workflow management system platform may access a scenario database storing electronic records associated with a plurality of enterprise scenarios, including, for each scenario, a scenario identifier and at least one workflow identifier. According to some embodiments, the scenario database may further store scenario names (e.g., text and/or images that can be utilized by a user to recognize a scenario's purpose) and/or scenario descriptions (e.g., a written description of the goal of the scenario, the function of the scenario, etc.).

At S220, the workflow management system platform may access a workflow database storing electronic records associated with a plurality of enterprise workflows including, for each workflow, a workflow identifier, a valid from date, a valid to date, and an order value (e.g., to be used to sequence workflows within a scenario). According to some embodiments, the workflow database may further store workflow names (e.g., text and/or images that can be utilized by a user to recognize a workflow's purpose), workflow descriptions (e.g., a written description of the goal of the workflow, tasks associated with the workflow, etc.), workflow statuses (e.g., pending, completed, in process, etc.), workflow preconditions (e.g., one or more conditions that must be satisfied before the workflow will be started), and/or workflow steps (e.g., identifying various tasks, jobs, etc. associated with the workflow).

At S230, the workflow management system platform may display a substantially linear graphical timeline representing a series of dates. For example, the timeline might comprise a line of 31 values representing each of the days in January. The system may, according to some embodiments, receive from a user a timeline scale value, and the substantially linear graphical timeline may then rendered in accordance with the timeline scale value. For example, a user might select a weekly view, yearly view, etc. of the timeline. According to some embodiments, the workflow management system platform may also display, on the graphical timeline, an indication of a current date relative to workflow areas (e.g., a vertical dashed line might indicate that the current date is January 15$^{th}$).

At S240, the workflow management system platform may automatically display information about the plurality of scenarios. According to some embodiments, for each workflow associated with a scenario a workflow area may be displayed extending from a start location associated with the workflow's valid from date on the graphical timeline to an end location associated with the workflow's valid to date on the graphical timeline. Moreover, workflow areas within a scenario might be presented in a sequence in accordance with the order values.

Note that according to some embodiments, a user preference data store may contain workflow management schedule preferences for each of a plurality of users. The preferences might indicate, for example, a user's preferred visual layout, color scheme, scenarios, display options, etc. In addition, according to some embodiments, the workflow management system platform may automatically start a workflow within a scenario based on workflow order values and preconditions (e.g., the first workflow that has all preconditions satisfied might be automatically started).

Figure 3:
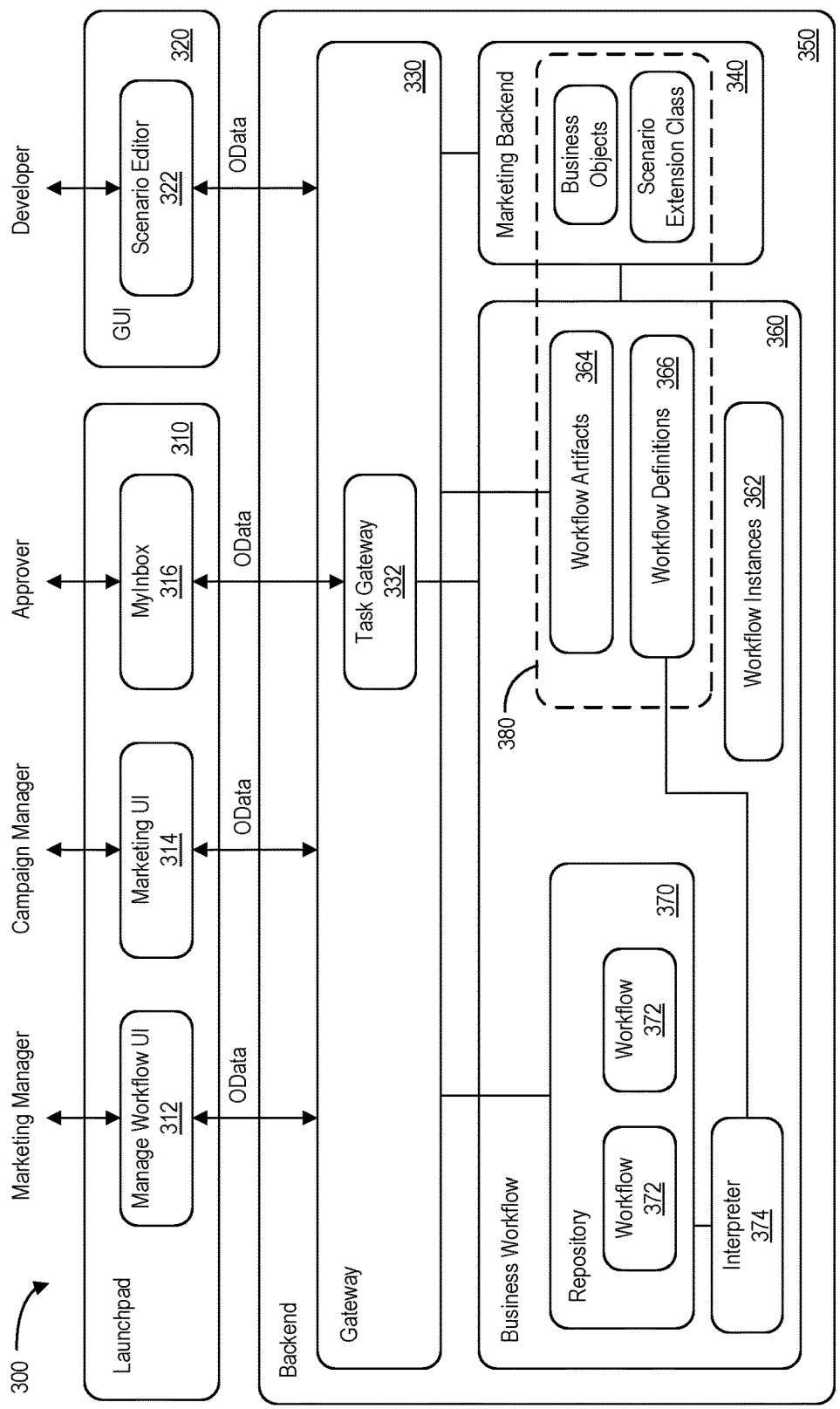
FIG. 3 is a workflow management architecture in accordance with some embodiments.

Embodiments described herein may be implemented using a number of different system architectures. For example, FIG. 3 is a workflow management architecture 300 in accordance with some embodiments. In particular, the architecture 300 includes a backend 350 that communicated with some users (e.g., a marketing manager, campaign manager, and approver) via a launchpad 310 and other users (e.g., a developer) via a scenario editor 322 of a Graphical User Interface ("GUI") 320. The launchpad 310 might be, for example, a shell that hosts applications, and provides the applications with services such as navigation, personalization, embedded support, and/or application configuration. The launchpad 310 might include, for example, a manage workflow User Interface ("UI") 312, a marketing US 314, and a MyInbox application 316.

According to some embodiments, the launchpad 310 and GUI 320 exchange information with the backend 350 in accordance with the Open Data ("OData") protocol (e.g. using an appropriate Application Programming Interface ("API")). Note that the backend 350 might be associated with an in-memory Enterprise Resource Planning ("ERP") suite that acts as a "digital core" of an entire enterprise. The backend 350 might, for example, support the Internet of Things ("IoT"), big data, real-time analytics, mobile, business networks, third-party systems, etc.

The backend 350 may include a gateway 330 (e.g., with a task gateway 332 to communicate with the MyInbox application 316), a business workflow 360, and a marketing backend 340. The business workflow 360 might include a repository 370 (e.g., containing workflows 372), an interpreter 374, workflow instances 362, workflow artifacts 364 (e.g., including steps, conditions and/or agent rules), and/or workflow definitions 366. The marketing backend 340 might include business objects and a scenario extension class. According to some embodiments, the workflow artifacts 364, workflow definitions 366, business objects, and scenario extension class together might comprise a scenario 380.

Figure 4:
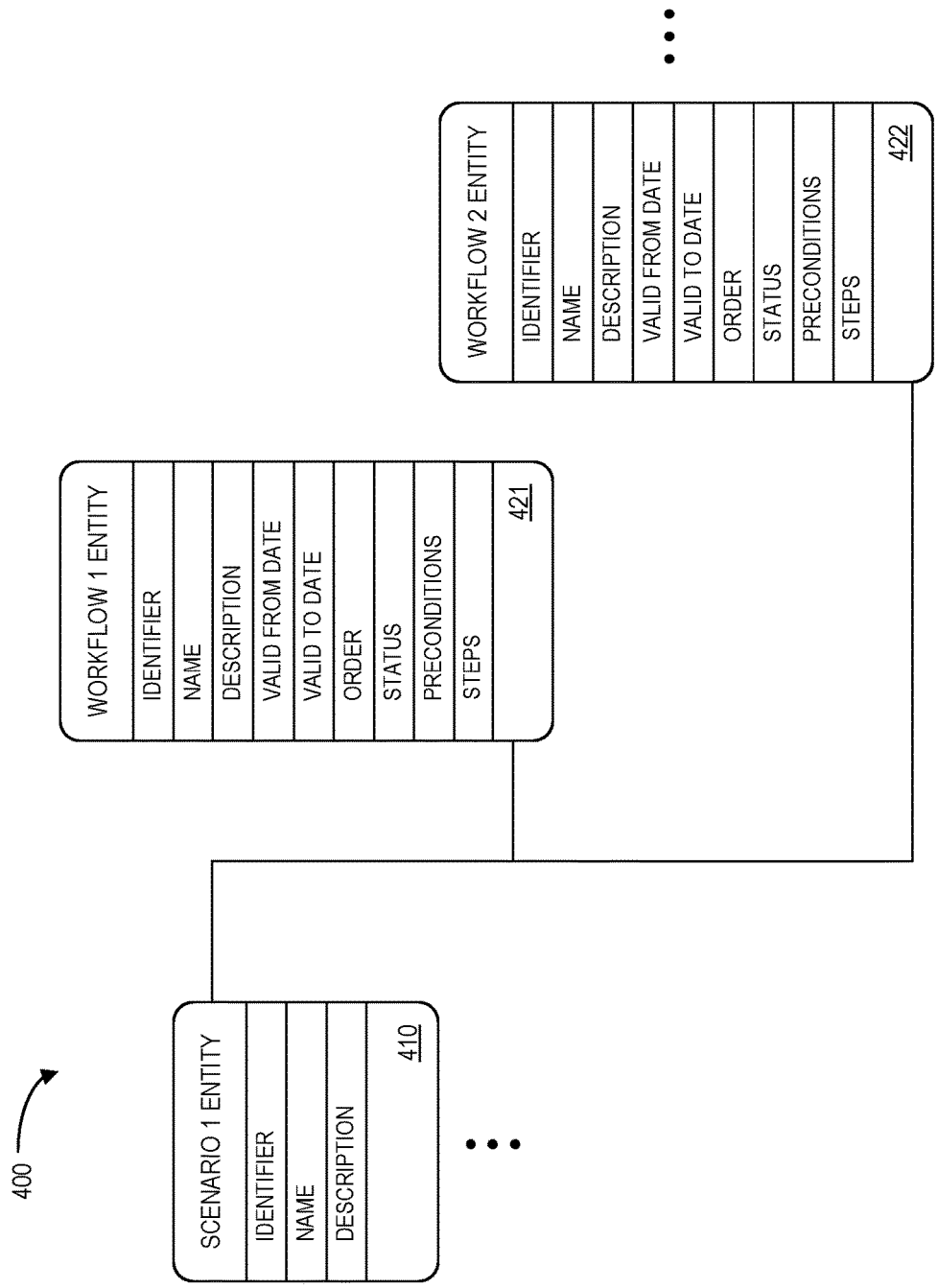
FIG. 4 is an entity relationship diagram according to some embodiments.

The architecture 300 may be used to define and/or adjust scenario and/or workflow entities. For example, FIG. 4 is an entity relationship diagram 400 according to some embodiments. In this example, a single scenario 410 ("scenario 1 entity") might be linked to two workflow entities 421, 422 ("workflow 1 entity" and "workflow 2 entity," respectively). Note that embodiments might be associated with any number of scenario entities 410 and/or workflow entities 421, 422. The scenario entity 410 might define an identifier, name, and/or description for the scenario. Each workflow entity 421, 422 might define an identifier, name, description, valid from date, valid to date, order (e.g., to place the workflow within a sequence for a scenario), status, preconditions, and/or steps for the workflow.

Figure 5:
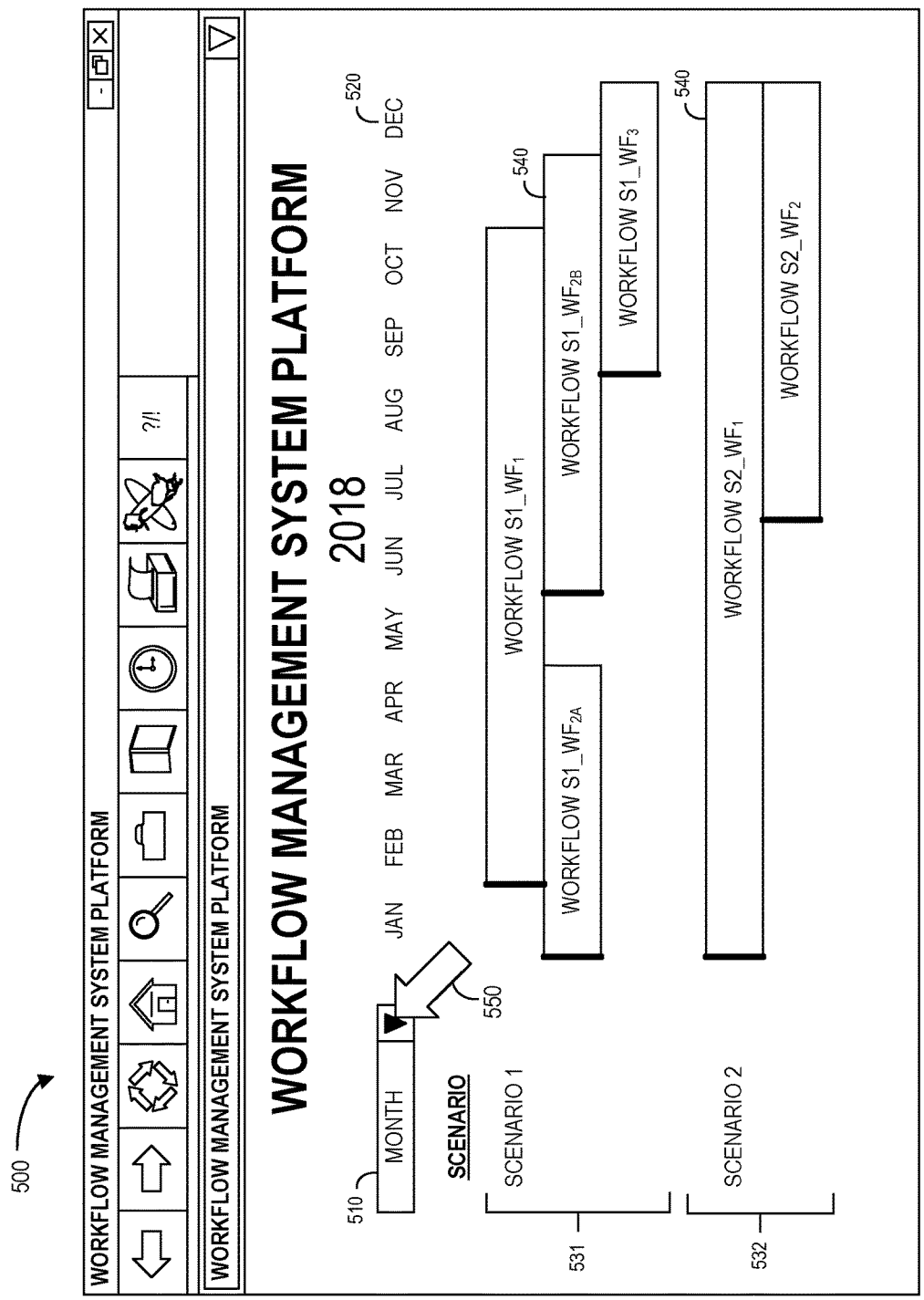
FIG. 5 is an interactive graphical user workflow management display in accordance with some embodiments.

FIG. 5 is an interactive graphical user workflow management display 500 in accordance with some embodiments. The display 500 includes a user selectable (e.g., via a drop-down menu using a computer mouse pointer 550) timeline scale value 510. Moreover, a substantially linear graphical timeline 520 may be rendered in accordance with the timeline scale value 510 (e.g., from January, 2018 to December 2018 as illustrated in FIG. 5). The display 500 also includes areas displaying scenarios, namely "scenario 1" 531 and "scenario 2" 532. Each scenario includes a number of graphically displayed workflows 540. In particular, scenario 1 includes three rows of workflows 540: (i) $S1\_WF_1$, (ii) $S1\_WF_{2A}$ and $S1\_WF_{2B}$, and (iii) $S1\_W_{F3}$. Scenario 2 includes two rows of workflows 540: (i) $S2\_WF_1$ and (ii) $S2\_WF_2$. Note that each workflow 540 is an area extending from a start location associated with the workflow's "valid from date" on the graphical timeline 520 to an end location associated with the workflow's "valid to date" on the graphical timeline 520. Moreover, workflow areas within a scenario may be presented in a sequence in accordance with the order values. For example, workflow $S2\_WF_1$ might have an order value of "1" while $S2\_WF_2$ has an order value of "2" (causing $S2\_WF_1$ to be displayed first, above $S2\_WF_2$). In this way, a user looking at the display 500 can quickly see how different workflows 540 relate to each other (e.g., which workflows 540 occur simultaneously, which workflows 540 are sequential, etc.).

Figure 6:
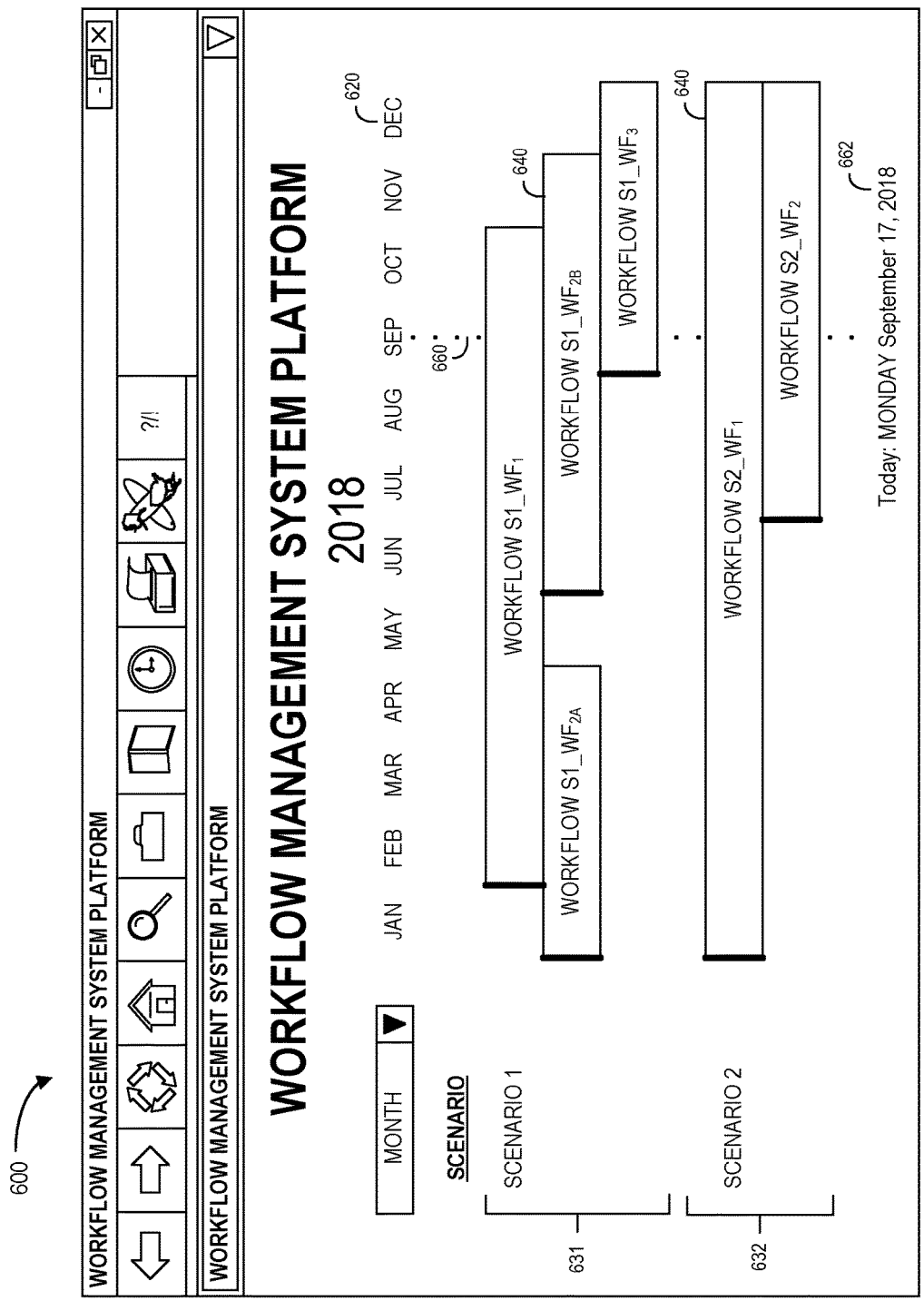
FIG. 6 is an interactive graphical user workflow management display with a current time indication according to some embodiments.

According to some embodiments, a workflow management system platform may also display, on a graphical timeline, an indication of a current date relative to workflow areas. For example, FIG. 6 is an interactive graphical user workflow management system display 600 with a current time indication according to some embodiments. As before, the display 600 includes a substantially linear graphical timeline 620 rendered in accordance with a timeline scale value (e.g., daily, weekly, monthly, yearly, etc.). The display 600 also includes scenarios 631, 632 and workflows 640. In this example, the display 600 further includes an indication of a current date 660 (e.g., a vertical dotted line). Moreover, the display 600 includes a readout of the current date 662 proximate to that indication 660 (indicate that the current date is Monday, Sep. 17, 2018). In this way, a user looking at the display 600 can quickly determine which workflows 640 are in the past, which workflows 640 are currently being performed, which workflows 640 have not started yet, etc.

Figure 7:
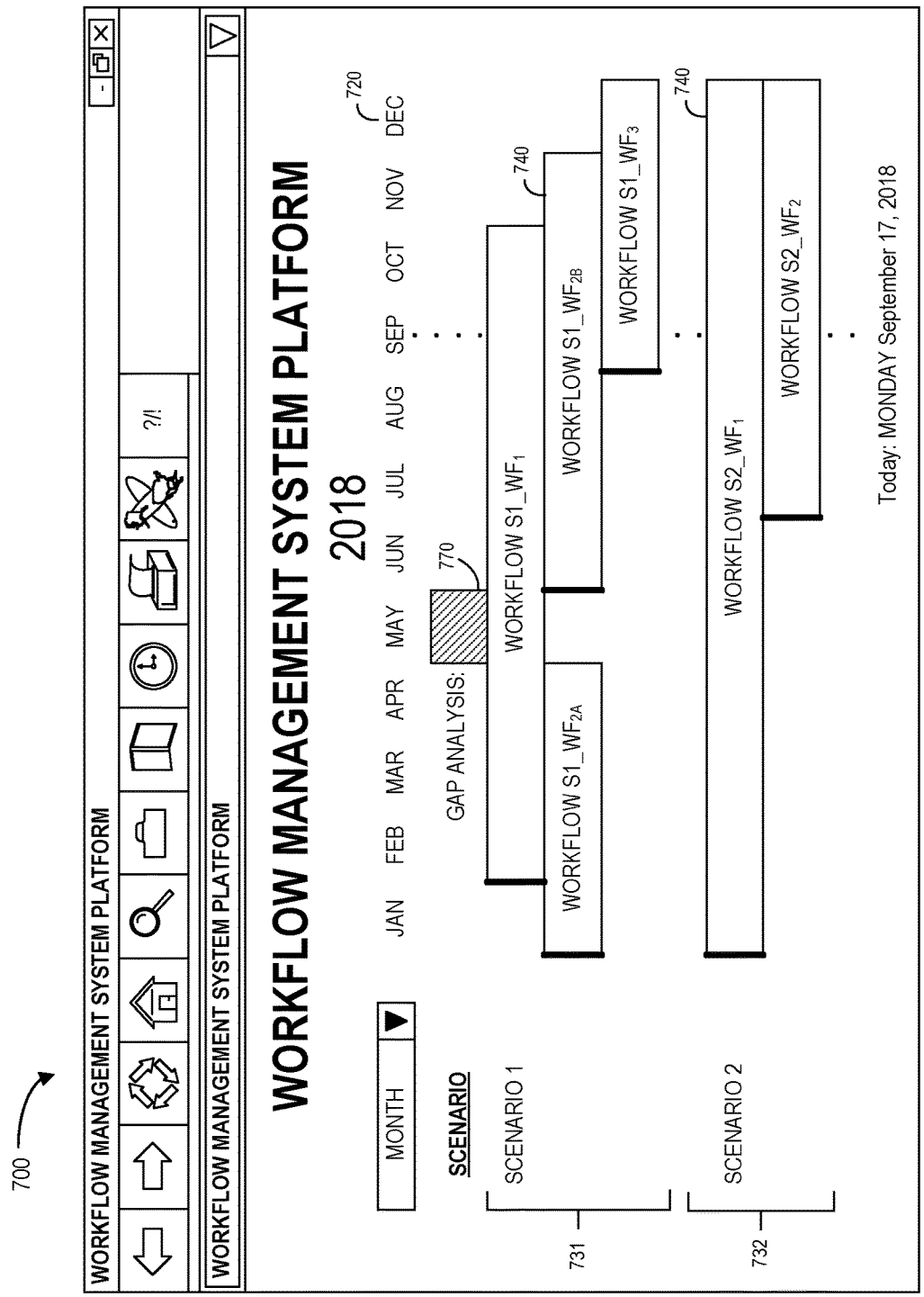
FIG. 7 is an interactive graphical user workflow management display with automatic workflow gap analysis according to some embodiments.

According to some embodiments, a workflow management system platform may further automatically perform a gap analysis associated with a relationship between a "valid to date" of a first workflow and a "valid from date" of a second workflow, the first and second workflows having the same order value. For example, FIG. 7 is an interactive graphical user workflow management system display 700 with gap analysis according to some embodiments. As before, the display 700 includes a substantially linear graphical timeline 720 rendered in accordance with a timeline scale. The display 700 also includes scenarios 731, 732 and workflows 740. In this example, the display 700 further includes a graphical gap analysis indication 770. In particular, the gap analysis determined that workflow 740 $S1\_WF_{2A}$ ended before workflow 740 $S1\_WF_{2B}$ started. As a result, the cross-hatched indication 770 shows the gap where neither workflow 740 is scheduled. Note that the graphical representation of the result of the gap analysis proximate to the graphical timeline. In this way, a user looking at the display 700 can quickly determine if a workflow 740 should be extended, started earlier, etc. (in order to "close" any gaps).

Figure 8:
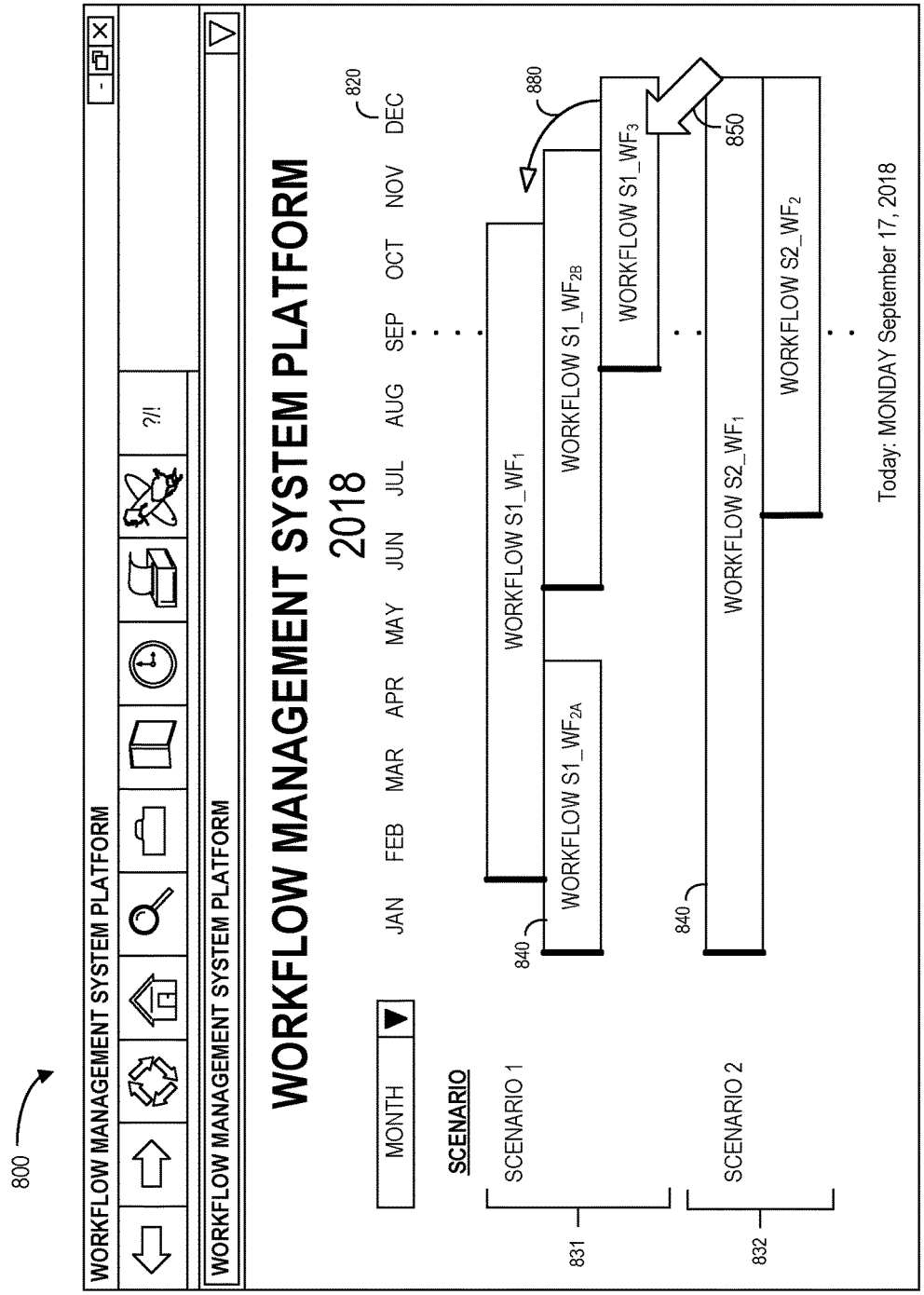
FIGS. 8 and 9 illustrate use of an interactive graphical user workflow management display to re-order workflows in accordance with some embodiments.
Figure 9:
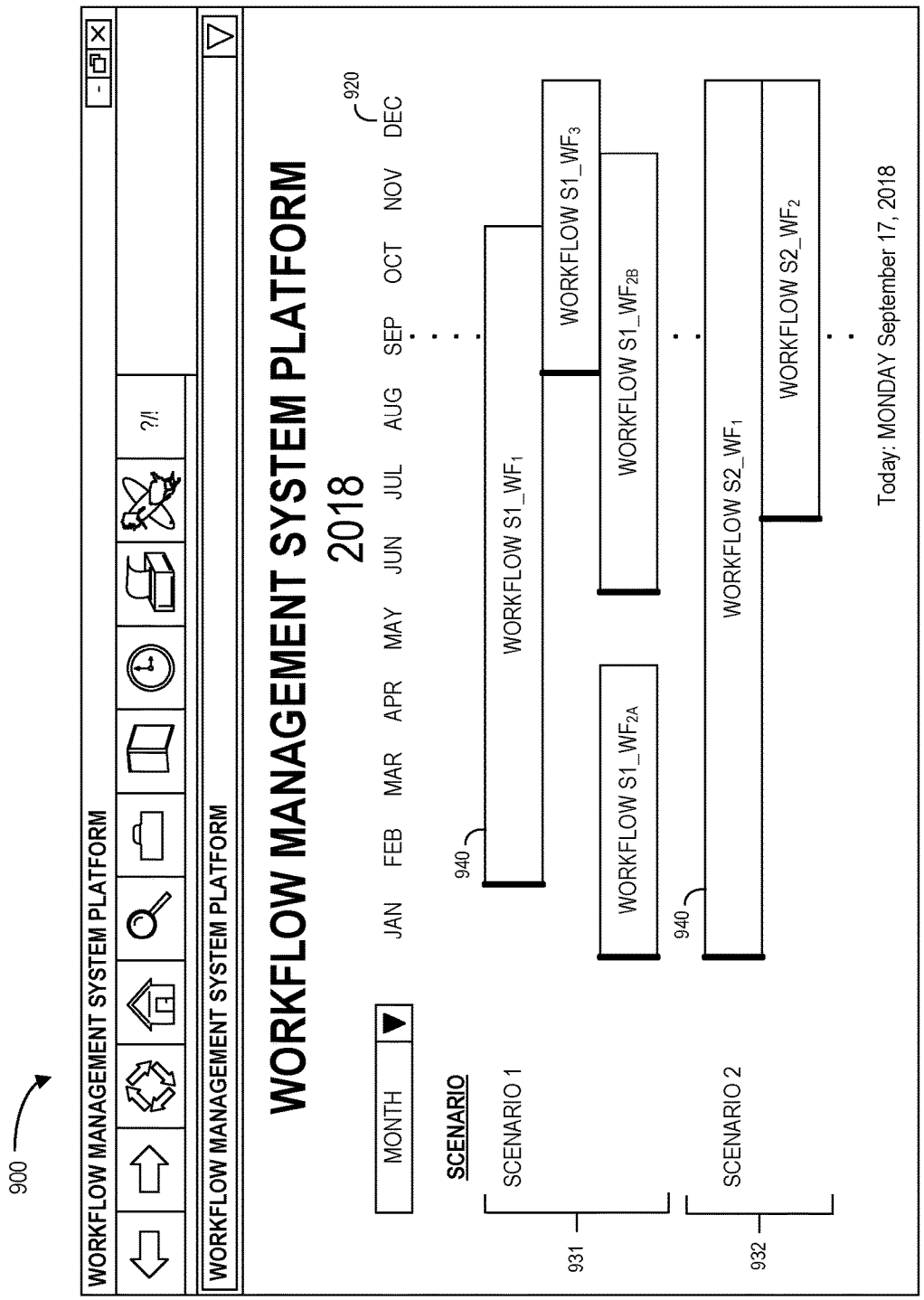

According to some embodiments, a workflow management system platform may, responsive to an input received from a user via an interactive graphical interface, adjust at least one workflow order value. For example, FIGS. 8 and 9 illustrate use of an interactive graphical user workflow management display to re-order workflows in accordance with some embodiments. In particular, the display 800 of FIG. 8 includes a timeline 820 and two scenarios 831, 832 each having workflows 840. In this example, a user might utilize a computer mouse pointer 850 to graphically move workflow 840 $S1\_WF_3$ upwards on the display 800 to a location between workflows 840 $S1\_WF_1$ and $S1\_WF_{2B}$. As a result of this action, the workflow management system platform might change an order value of $S1\_WF_{2B}$ from "2" to "3," and an order value of $S1\_WF_3$ from "3" to "2." FIG. 9 illustrates a display 900 with a timeline 920, scenarios 931, 932, and workflows 940. As can be seen, the workflow $S1\_WF_3$ now appears above $S1\_WF_{2B}$.

Figure 10:
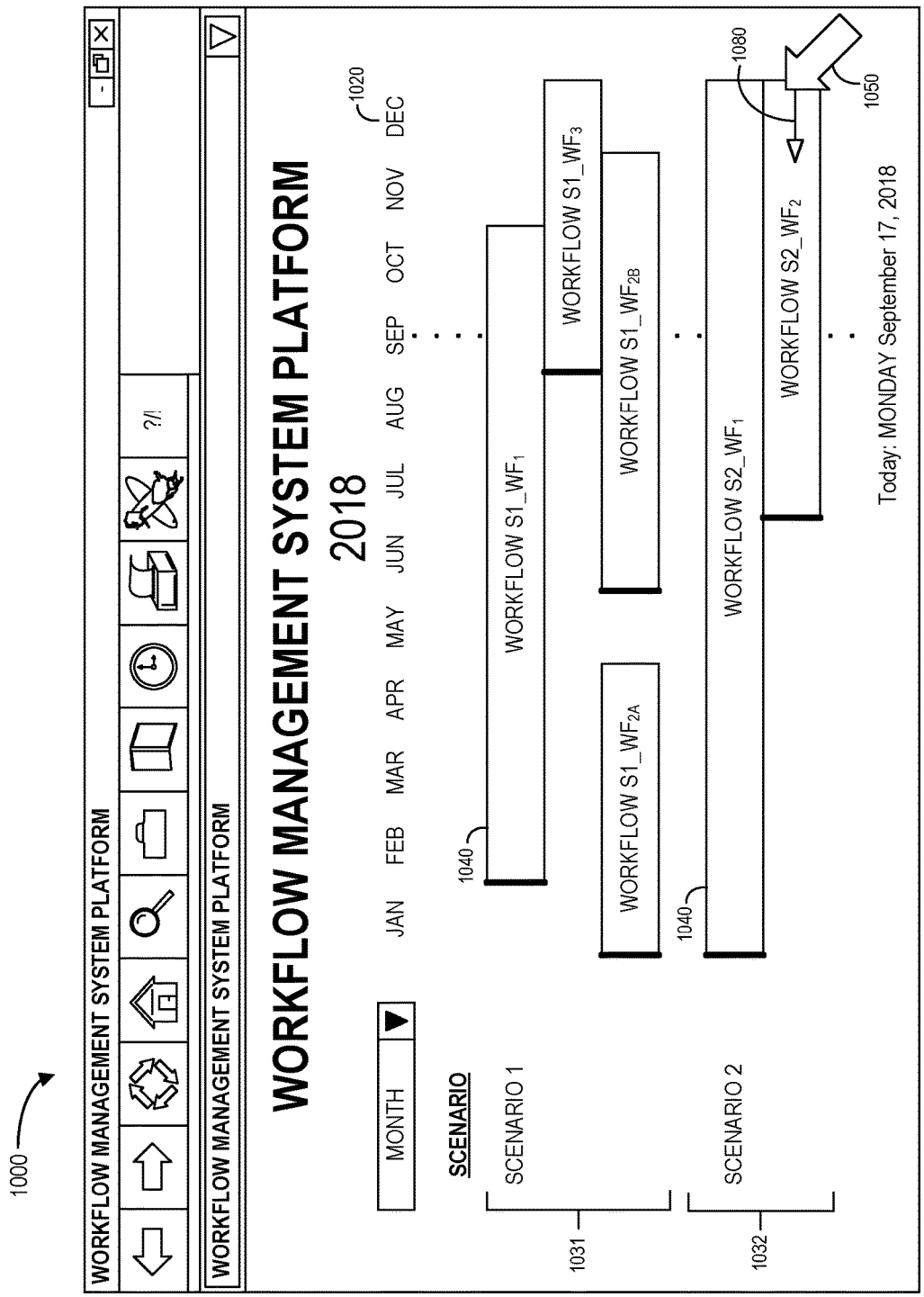
FIGS. 10 and 11 illustrate use of an interactive graphical user workflow management display to re-schedule a workflow according to some embodiments.
Figure 11:
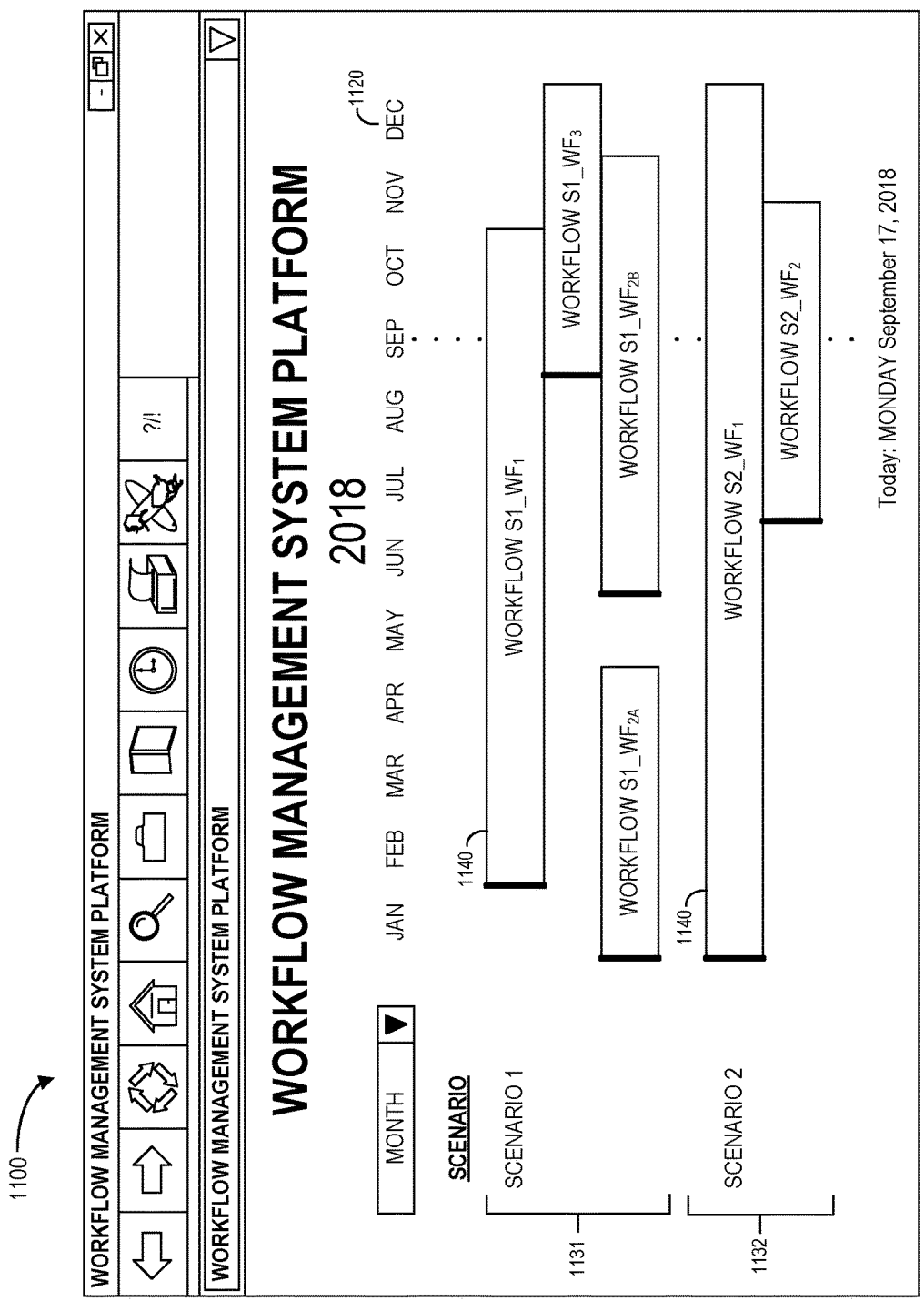

According to some embodiments, a workflow management system platform may, responsive to an input received from a user via an interactive graphical interface, adjust at least one of a workflow's valid from date or a workflow's valid to date. For example, FIGS. 10 and 11 illustrate use of an interactive graphical user workflow management display to re-schedule a workflow according to some embodiments. In particular, the display 1000 of FIG. 10 includes a timeline 1020 and two scenarios 1031, 1032 each having workflows 1040. In this example, a user might utilize a computer mouse pointer 1050 to graphically move the end date ("valid to date") of workflow 840 $S2\_WF_2$ leftward on the display from "DEC" 2018 to "NOV" 2018. As a result of this action, the workflow management system platform might change the "valid to date" of $S2\_WF_2$ from "December 2018" to "November 2018." FIG. 11 illustrates a display 1100 with a timeline 1120, scenarios 1131, 1132, and workflows 1140. As can be seen, the workflow $S2\_WF_2$ now ends in November, 2018. According to some embodiments, a workflow management system platform may, prior to said adjusting, verify that a current date is prior to a date being adjusted (that is, the date cannot be changed because it has already occurred).

Figure 12:
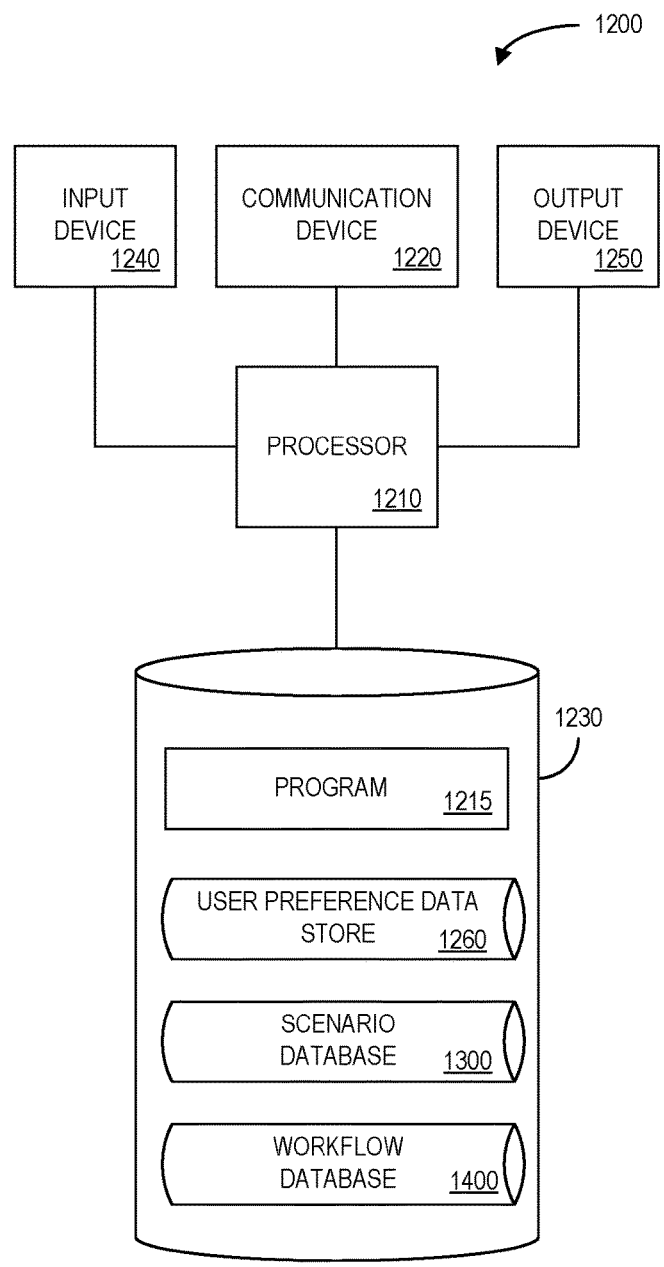
FIG. 12 is a high level diagram of an apparatus or platform in accordance with some embodiments.

Embodiments described herein may comprise a tool or plug-in that facilitates workflow management by a user. For example, FIG. 12 illustrates a workflow management system apparatus or platform 1200 that may be, for example, associated with the system 120 of FIG. 1. The workflow management system platform 1200 comprises a processor 1210, such as one or more commercially available Central Processing Units ("CPUs") in the form of one-chip microprocessors, coupled to a communication device 1220 configured to communicate via a communication network (not shown in FIG. 12). The communication device 1220 may be used to communicate, for example, with one or more remote user devices (e.g., PCs and smartphones). Note that communications exchanged via the communication device 1220 may utilize security features, such as those between a public internet user and an internal network of the insurance enterprise. The security features might be associated with, for example, web servers, firewalls, and/or PCI infrastructure. The workflow management system platform 1200 further includes an input device 1240 (e.g., a mouse and/or keyboard to enter information about scheduling preconditions, user roles, etc.) and an output device 1250 (e.g., to output reports regarding user preferences and/or overall workflow planning and management).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1215 and/or an existing association review tool or application for controlling the processor 1210. The processor 1210 performs instructions of the program 1215, and thereby operates in accordance with any of the embodiments described herein. For example, the processor 1210 may access electronic data records in a scenario database 1300, including, for each of a plurality of scenarios, a scenario identifier and a set of associated workflow identifiers. Electronic data records in a workflow database 1400 may also be accessed by the processor 1210, including, for each of a plurality of workflows, a workflow identifier, a valid from date, a valid to date, and an order value. The processor 1210 may then automatically display information about the plurality of scenarios. For example, for each workflow associated with a scenario, a workflow area may be displayed by the processor 1210 extending from a start location associated with the workflow's valid from date on the graphical timeline to an end location associated with the workflow's valid to date on the graphical timeline. According to some embodiments, workflow areas within a scenario may be presented by the processor 1210 in a sequence in accordance with order values.

The program 1215 may be stored in a compressed, uncompiled and/or encrypted format. The program 1215 may furthermore include other program elements, such as an operating system, a database management system, and/or device drivers used by the processor 1210 to interface with peripheral devices.

As used herein, information may be "received" by or "transmitted" to, for example: (i) the workflow management system platform 1200 from another device; or (ii) a software application or module within the workflow management system platform 1200 from another software application, module, or any other source.

In some embodiments (such as shown in FIG. 12), the storage device 1230 further stores a user preference data store 1260 (e.g., associated with different users, types of users, user roles, types of workflows, etc. and what types of gap analysis, precondition checks, etc. should be available in various situations), the scenario database 1300, and the workflow database 1400. Example of databases that might be used in connection with the workflow management system platform 1200 will now be described in detail with respect to FIGS. 13 and 14. Note that the databases described herein are only examples, and additional and/or different information may be stored therein. Moreover, various databases might be split or combined in accordance with any of the embodiments described herein. For example, the user preference data store 1260 and/or scenario database 1300 might be combined and/or linked to each other within the program 1215.

Figure 13:
FIG. 13 is a portion of a tabular scenario database that might be provided according to some embodiments.

Referring to FIG. 13, a table is shown that represents the scenario database 1300 that may be stored at the workflow management system platform 1200 according to some embodiments. The table may include, for example, entries identifying scenarios that may be managed for an enterprise. The table may also define fields 1302, 1304, 1306, 1308 for each of the entries. The fields 1302, 1304, 1306, 1308 may, according to some embodiments, specify: a scenario identifier 1302, workflow identifiers 1304, a name 1306, and a description 1308. The scenario database 1300 may be created and updated, for example, based on information electronically received from other database and/or from users (e.g., via interactive graphical displays).

The scenario identifier 1302 may be, for example, a unique alphanumeric code identifying a set of tasks that may need to be performed for an enterprise. The workflow identifiers 1304 may be, for example, unique alphanumeric codes that define which workflows are included in the scenario. The name 1306 might comprise text and/or images that can be utilized by a user to recognize a scenario's purpose. The description might represent a written description of the goal of the scenario, the function of the scenario, etc.

Figure 14:
FIG. 14 is a portion of a tabular workflow database that might be provided according to some embodiments.

Referring to FIG. 14, a table is shown that represents the workflow database 1400 that may be stored at the workflow management system platform 1200 according to some embodiments. The table may include, for example, entries identifying scenarios that may be managed for an enterprise. The table may also define fields 1402, 1404, 1406, 1408, 1410, 1412 for each of the entries. The fields 1402, 1404, 1406, 1408, 1410, 1412 may, according to some embodiments, specify: a workflow identifier 1402, a name 1404, a valid from date 1406, a valid to date 1408, an order 1410, and preconditions (steps) 1412. The workflow database 1400 may be created and updated, for example, based on information electronically received from other database and/or from users (e.g., via interactive graphical displays).

The workflow identifier 1402 may be, for example, a unique alphanumeric code identifying workflows that might be scheduled and/or performed for an enterprise. The workflow identifier 1402 might be, according to some embodiments, based on or associated with the workflow identifiers 1304 in the scenario database of FIG. 13. The name 1404 might comprise text and/or images that can be utilized by a user to recognize a workflow's purpose. The valid from date 1406 and valid to date 1408 might define a period of time during which the workflow is defined. The order 1410 might be, for example, a value used to sequence workflows within a scenario. The preconditions (steps) 1412 might, according to some embodiments, define when a workflow should be automatically started.

Thus, embodiments might holistically tell a user about a current state of a workflow along with information about what workflows are planned in the future. Moreover, auditing may be supported by showing information about the workflows that have been performed in the past. According to some embodiments, a gap analysis might automatically help a user identify changes that should be made to workflows.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

Figure 15:
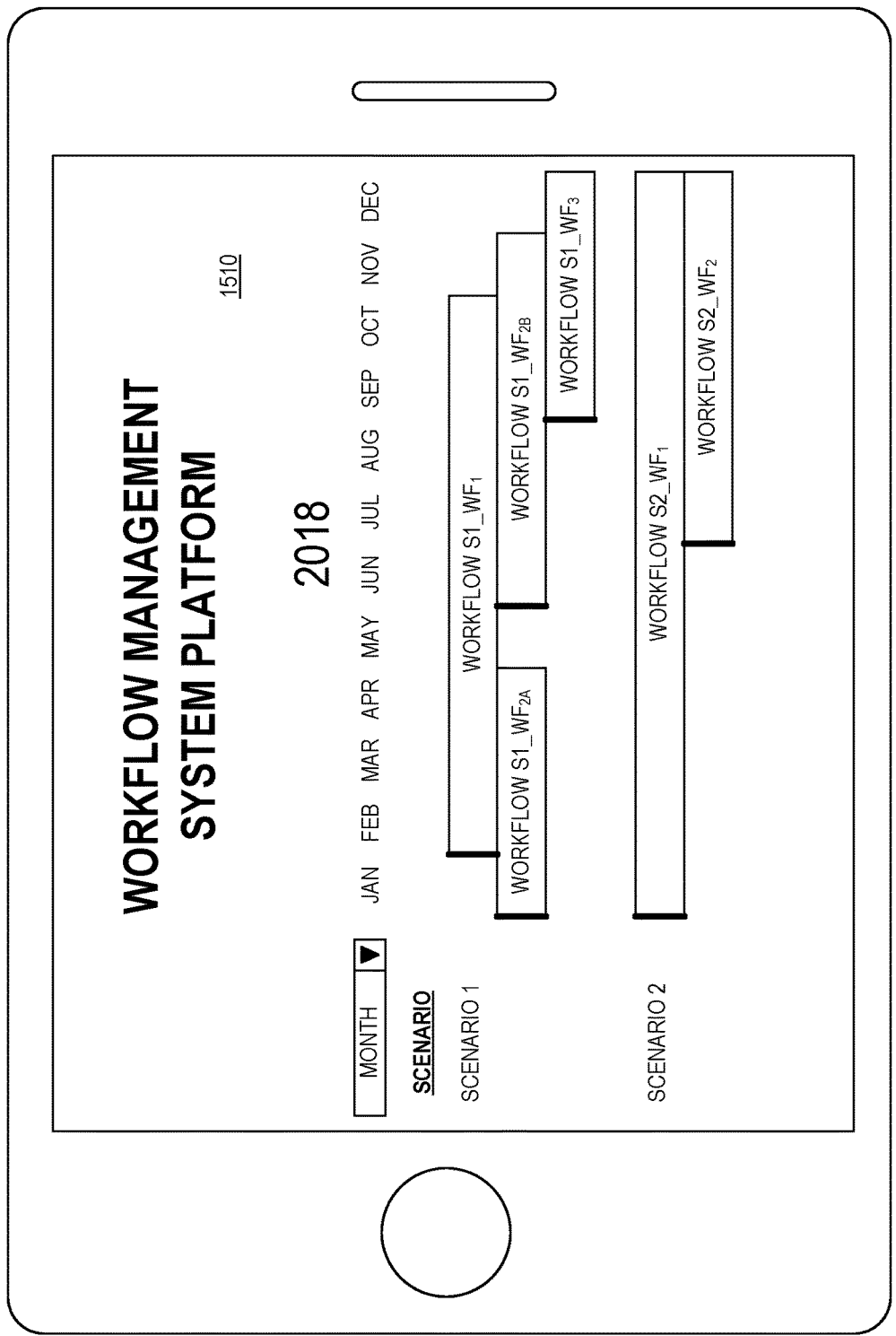
FIG. 15 illustrates a tablet or handheld computer being used according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of data structures and attribute characteristics, embodiments may instead be associated with other types of data (e.g., additional information might be collected and/or automatically used about scenarios, workflows, etc.). Still further, the displays and devices illustrated herein are only provided as examples, and embodiments may be associated with any other types of user interfaces. For example, FIG. 15 illustrates a tablet or handheld computer 1500 being used according to some embodiments. In particular, computer 1500 includes a display 1510 with scenario and workflow information. In this way, a user might utilize a touch sensitive screen to re-order workflows within a scenario, adjust workflow start or end dates, etc.

According to some embodiments, data may be used in conjunction with one or more models to take into account a large number of scenarios, workflows, users, and/or situations. For example, the system might use a predictive model to suggest that a particular workflow be adjusted based on the user's past decisions (or the decisions of other users in similar situations). The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior examples and outcomes known to an enterprise. The specific data and outcomes analyzed may vary depending on the desired functionality of the particular predictive model. The particular parameters selected for analysis in the training process may be determined by using regression analysis and/or other statistical techniques known in the art for identifying relevant variables and associated weighting factors in multivariable systems.

Embodiments described herein are solely for the purpose of illustration. Those in the art will recognize other embodiments may be practiced with modifications and alterations to that described above.

What is claimed is:

1. A system, comprising:
  a communication port to receive information from a user via a launchpad, which hosts applications and provides the applications with application-related services, or via an interactive graphical interface;
  a scenario database storing electronic records associated with a plurality of enterprise scenarios, including, for each scenario, a scenario identifier and at least one workflow identifier;
  a workflow database storing electronic records associated with a plurality of enterprise workflows including, for each workflow, a workflow identifier, a valid from date, a valid to date, and an order value; and
  a workflow management system platform, coupled to the communication port, the scenario database, and the workflow database, the workflow management system platform comprising a backend system that communicates with users via the launchpad or the interactive graphical interface, and the backend system comprising a business workflow including a data store storing a plurality of workflow components,
  the workflow management system platform further comprising:
    a memory storing processor-executable program code, and
    a processor to execute the processor-executable program code in order to cause the workflow management system platform to:
      access electronic data records in the scenario database, including, for each of a plurality of scenarios, a scenario identifier and a set of associated workflow identifiers,
      access electronic data records in the workflow database, including, for each of a plurality of workflows, a workflow identifier, a valid from date, a valid to date, and an order value,
      display, via the interactive graphical interface, a substantially linear graphical timeline representing a series of dates,
      automatically display, via the interactive graphical interface, information about the plurality of scenarios, including, for each workflow associated with a scenario:
        a workflow area extending from a start location associated with the workflow's valid from date on the graphical timeline to an end location associated with the workflow's valid to date on the graphical timeline, wherein workflow areas within a scenario are presented in a sequence in accordance with the order values,
      automatically start a workflow within a scenario based on workflow order values and preconditions,
      automatically perform a gap analysis associated with a relationship between a valid to date of a first workflow and a valid from date of a second workflow, the first and second workflows having the same order value, wherein a graphical representation of a result of the gap analysis is displayed proximate to the graphical timeline, and
      in response to an input received from the user via the interactive graphical interface, adjust at least one of a workflow's valid from date or a workflow's valid to date.

2. The system of claim 1, wherein the workflow management system platform is further to display, on the graphical timeline, an indication of a current date relative to the workflow areas.

3. The system of claim 1, further comprising
  a user preference data store containing workflow management schedule preferences for each of a plurality of users.

4. The system of claim 1, wherein the scenario database further stores: (i) scenario names, and (ii) scenario descriptions.

5. The system of claim 1, wherein the workflow database further stores: (i) workflow names, (ii) workflow descriptions, (iii) workflow statuses, (iv) workflow preconditions, and (v) workflow steps.

6. The system of claim 1, wherein the communication port is to receive, from the user, a timeline scale value, and the substantially linear graphical timeline is rendered in accordance with the timeline scale value.

7. The system of claim 1, wherein the workflow management system platform is further to, responsive to an input received from the user via the interactive graphical interface, adjust at least one workflow order value.

8. The system of claim 1, wherein the workflow management system platform is further to, prior to said adjusting, verify that a current date is prior to a date being adjusted.

9. The system of claim 1, wherein the workflow management system platform exchanges information in accordance with the Open Data ("OData") protocol.

10. A computer-implemented method, comprising:
accessing, by a workflow management system platform, electronic data records in a scenario database, including, for each of a plurality of scenarios, a scenario identifier and a set of associated workflow identifiers,
wherein the workflow management system platform is coupled to a communication port, a scenario database, and a workflow database, the workflow management system platform comprising a backend system that communicates with users via a launchpad, which hosts applications and provides the applications with application-related services, or via an interactive graphical interface, and the backend system comprising a business workflow including a data store storing a plurality of workflow components;
accessing, via the workflow management system platform, electronic data records in a workflow database, including, for each of a plurality of workflows, a workflow identifier, a valid from date, a valid to date, and an order value;
displaying, via the interactive graphical interface, a substantially linear graphical timeline representing a series of dates;
automatically displaying, via the interactive graphical interface, information about the plurality of scenarios, including, for each workflow associated with a scenario:
a workflow area extending from a start location associated with the workflow's valid from date on the graphical timeline to an end location associated with the workflow's valid to date on the graphical timeline, wherein workflow areas within a scenario are presented in a sequence in accordance with the order values;
automatically starting a workflow within a scenario based on workflow order values and preconditions,
automatically performing a gap analysis associated with a relationship between a valid to date of a first workflow and a valid from date of a second workflow, the first and second workflows having the same order value, wherein a graphical representation of a result of the gap analysis is displayed proximate to the graphical timeline, and
in response to an input received from the user via the interactive graphical interface, adjusting at least one of a workflow's valid from date or a workflow's valid to date.

11. The method of claim 10, wherein: the workflow management system platform is further to display, on the graphical timeline, an indication of a current date relative to the workflow areas; the scenario database further stores: (i) scenario names, and (ii) scenario descriptions; and the workflow database further stores: (i) workflow names, (ii) workflow descriptions, (iii) workflow statuses, (iv) workflow preconditions, and (v) workflow steps.

12. The method of claim 10, wherein the workflow management system platform is further to, responsive to an input received from the user via the interactive graphical interface, adjust at least one workflow order value.

13. The method of claim 10, wherein the workflow management system platform is further to, prior to said adjusting, verify that a current date is prior to a date being adjusted.

14. A non-transitory, computer-readable medium storing program code, the program code executable by a processor of a workflow management system platform coupled to a communication port, a scenario database, and a workflow database, the workflow management system platform comprising a backend system that communicates with users via a launchpad, which hosts applications and provides the applications with application-related services, or via an interactive graphical interface, and the backend system comprising a business workflow including a data store storing a plurality of workflow components, to cause the processor to:
access, via the workflow management system platform, electronic data records in a scenario database, including, for each of a plurality of scenarios, a scenario identifier and a set of associated workflow identifiers;
access, via the workflow management system platform, electronic data records in a workflow database, including, for each of a plurality of workflows, a workflow identifier, a valid from date, a valid to date, and an order value;
display, via the interactive graphical interface, a substantially linear graphical timeline representing a series of dates; and
automatically display, via the interactive graphical interface, information about the plurality of scenarios, including, for each workflow associated with a scenario:
a workflow area extending from a start location associated with the workflow's valid from date on the graphical timeline to an end location associated with the workflow's valid to date on the graphical timeline, wherein workflow areas within a scenario are presented in a sequence in accordance with the order values;
automatically starting a workflow within a scenario based on workflow order values and preconditions,
automatically performing a gap analysis associated with a relationship between a valid to date of a first workflow and a valid from date of a second workflow, the first and second workflows having the same order value, wherein a graphical representation of a result of the gap analysis is displayed proximate to the graphical timeline, and
in response to an input received from the user via the interactive graphical interface, adjusting at least one of a workflow's valid from date or a workflow's valid to date.

15. The medium of claim 14, wherein the workflow management system platform is further to, responsive to an input received from the user via the interactive graphical interface, adjust at least one workflow order value.

16. The medium of claim 14, wherein the workflow management system platform is further to, prior to said adjusting, verify that a current date is prior to a date being adjusted.

* * * * *